US012654866B2

(12) United States Patent
Auroy et al.

(10) Patent No.: US 12,654,866 B2
(45) Date of Patent: Jun. 16, 2026

(54) AIRCRAFT POWER SUPPLY SYSTEM AND ASSOCIATED AIRCRAFT

(71) Applicant: DASSAULT AVIATION, Paris (FR)

(72) Inventors: Alexandre Auroy, Merignac Cedex (FR); Thomas Barraco, Merignac Cedex (FR); Zoé Sigrist, Merignac Cedex (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 18/950,279

(22) Filed: Nov. 18, 2024

(65) Prior Publication Data

US 2025/0162720 A1      May 22, 2025

(30) Foreign Application Priority Data

Nov. 16, 2023    (FR) ...................................... 2312566

(51) Int. Cl.
*B64D 27/35*          (2024.01)
(52) U.S. Cl.
CPC .......... *B64D 27/35* (2024.01); *B64D 2221/00* (2013.01)
(58) Field of Classification Search
None
See application file for complete search history.

(56) References Cited

U.S. PATENT DOCUMENTS

| | | | | |
|---|---|---|---|---|
| 11,643,940 B2 * | 5/2023 | Bruce | ....................... | H02J 4/00 |
| | | | | 307/9.1 |
| 2007/0284480 A1 * | 12/2007 | Atkey | .................... | B64D 13/08 |
| | | | | 244/102 R |
| 2010/0193630 A1 | 8/2010 | Duces | | |
| 2016/0359324 A1 * | 12/2016 | Knowles | .................. | H02J 3/38 |

FOREIGN PATENT DOCUMENTS

CA          2667270 A1     5/2008

OTHER PUBLICATIONS

Search Report for priority application FR 2312566.

* cited by examiner

*Primary Examiner* — Menatoallah Youssef
*Assistant Examiner* — Aqeel H Bukhari
(74) *Attorney, Agent, or Firm* — Davidson Kappel LLC

(57)          ABSTRACT
An aircraft power supply network and associated aircraft, the power supply network includes a first engine and a second engine, a first and a second set of loads, an auxiliary electrical source and a first electrical machine connected to the first engine. The power supply network also includes a first converter connected to the first electrical machine, a first interconnection bus connected to the first converter by a first primary switch and to the first set of loads and a second electrical machine connected to the second motor. The power supply network further includes a second converter, a second interconnection bus, connected to the second converter by a second primary switch and to the second set of loads, a sharing bus connected to the first interconnection bus by a first inter-bus switch, connected to the second interconnection bus by a second inter-bus switch and connected to the auxiliary electrical source.

14 Claims, 7 Drawing Sheets

AIRCRAFT POWER SUPPLY SYSTEM AND ASSOCIATED AIRCRAFT

TECHNICAL FIELD

The present disclosure relates to an aircraft power supply network and the associated aircraft.

BACKGROUND

It is known to integrate electrical networks into aircraft, which are used for example to supply electricity to the aircraft, for example to ensure the aircraft's drive functions, to electrically start the aircraft's engines or to hybridise the aircraft's engines. It is also known to equip aircraft with electrical power supply networks to distribute electricity generated by the engines to loads on board the aircraft. However, combining these functions means having to integrate a large number of networks into the aircraft, as well as a complex, poorly optimised architecture incorporating a large number of electrical devices such as converters.

SUMMARY

One of the goals of the present disclosure is therefore to offer a power supply network with a simple architecture that combines electricity distribution functions and drive functions in a reversible manner.

To this end, one purpose of the present disclosure is an aircraft power supply network comprising:
- a first engine and a second engine;
- a first set of loads and a second set of loads;
- an auxiliary power source;
- a first electrical machine, mechanically connected to the first engine;
- a first converter, connected to the first electrical machine;
- a first interconnection bus, connected on the one hand to the first converter by a first primary switch and on the other hand to the first set of loads;
- a second electrical machine, mechanically connected to the second engine;
- a second converter;
- a second interconnection bus, connected on the one hand to the second converter by a second primary switch and on the other hand to the second set of loads; and
- a sharing bus, connected to the first interconnection bus by a first inter-bus switch, connected to the second interconnection bus by a second inter-bus switch and connected to the auxiliary electrical source.

Thanks to the present disclosure, it is possible to install a power supply network that makes it possible to obtain electricity distribution functions, produced by the engines and used to power the load assemblies, and to obtain driving functions, for example starting or hybridising the engines from the auxiliary electrical source, with a single power supply network. The number of components is therefore limited, in particular the number of converters and electrical machines, since they are used both to supply mechanical torque to the engines and to power the load assemblies. The switches ensure the isolation of components in the event of a fault, and enable the power supply network to be configured according to a user's needs: power supply to load assemblies, or power supply to the engine.

According to other advantageous aspects of the present disclosure, the power supply network comprises one or more of the following features, taken in isolation or in any technically possible combinations:

The network comprises:
- a first additional converter, and a second additional converter connected respectively to the first electrical machine and to the second electrical machine;
- a first additional interconnection bus and a second additional interconnection bus, connected respectively to the first additional converter by a first additional primary switch and to the second additional converter by a second additional primary switch; and
- a first set of additional loads and a second set of additional loads, connected respectively to the first additional interconnection bus and to the second additional interconnection bus.

The first and second electrical machines have independent first and second windings respectively and the first and second converters are connected to the first windings of the first and second electrical machines respectively and the first and second additional converters are connected to the second windings of the first and second electrical machines respectively.

The first and second additional interconnection buses are directly and solely connected to the first interconnection bus by a first inter-group switch and to the second interconnection bus by a second inter-group switch respectively.

A first distribution bus and a second distribution bus, connected respectively to the first interconnection bus by a first secondary switch and to the second interconnection bus by a second secondary switch and connected respectively to the first set of loads and to the second set of loads.

The network further comprises a first additional distribution bus and a second additional distribution bus, the first and second additional distribution buses being respectively connected only:
- to the first distribution bus via a third inter-group switch, and to the second distribution bus via a fourth inter-group switch;
- the first set of additional charges and the second set of additional charges; and
- to the first additional interconnection bus by a first additional secondary switch, and to the second additional interconnection bus by a second additional secondary switch.

Two converters among the first converter, the second converter, the first additional converter and the second additional converter are voltage inverters and two converters are current inverters.

The first and second electrical machines are each one of an asynchronous machine, a synchronous machine and a variable reluctance machine.

The first and second interconnection buses are connected to the auxiliary power source only via the sharing bus.

The network also comprises a first battery and a second battery, connected respectively to the first interconnection bus and the second interconnection bus.

The network also comprises a first load converter and a second load converter, connected on the one hand to the first interconnection bus and the second interconnection bus respectively and on the other hand to the first set of loads and the second set of loads respectively.

The network is configured to be in a start-up configuration, in which:
- the first primary switch and the first inter-bus switch are closed; and the first electrical machine is powered by the auxiliary power source so that the first electrical machine generates a mechanical torque.

The network is configured to be in a power supply configuration, in which:

the first primary switch and the first secondary switch are closed; and the first electric machine converts a mechanical torque supplied by the first engine into an electric current.

The present disclosure also relates to an aircraft comprising a power supply network as described above.

In other advantageous aspects of the present disclosure, the aircraft further comprises:

an avionics functions network and a flight control network, connected to at least one electrical machine different from the first and second electrical machines, driven by one of the first and second engines.

SUMMARY OF THE DRAWINGS

The present disclosure will appear more clearly when reading the description that follows, given solely as a non-limiting example and made in reference to drawings in which:

FIG. 1 is a schematic depiction of an aircraft device according to the present disclosure;

DETAILED DESCRIPTION

Figure 2:
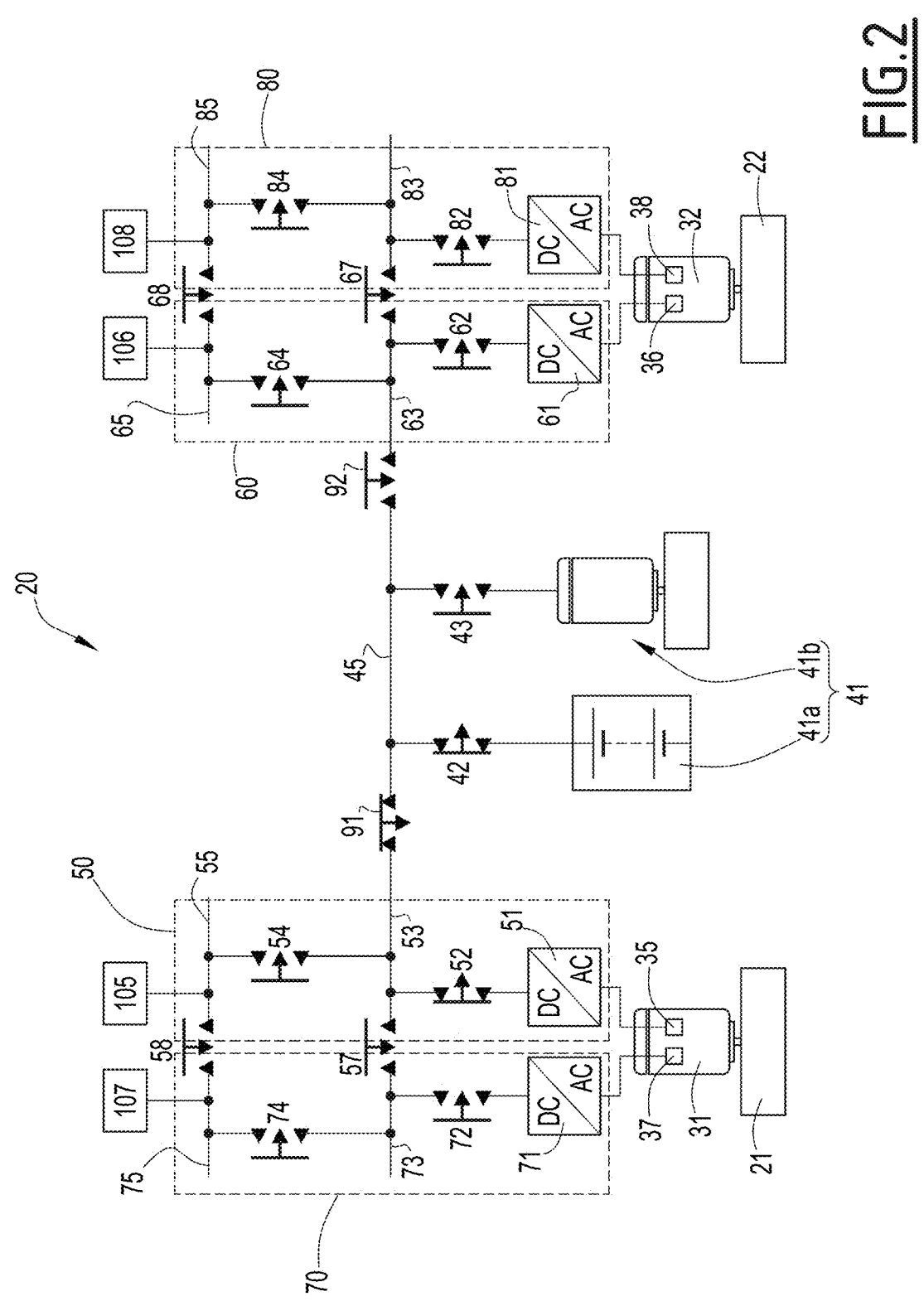
FIG. 2 is a diagram of a power supply network according to the present disclosure in a first start-up configuration.

FIG. 1 shows an aircraft 10, comprising a power supply network 20. The aircraft is, for example, an aeroplane or a drone. The power supply network 20 comprises a first engine 21 and a second engine 22, each mechanically connected to a first electrical machine 31 and a second electrical machine 32.

The first and second engines 21 and 22 are the engines that propel the aircraft 10, in particular when the aircraft is in flight, and are turbojet engines for example.

Each engine 21, 22 is mechanically connected to the first electrical machine 31 and the second electrical machine 32 respectively. Each electrical machine 31, 32 is configured to convert an electrical current into a mechanical force, advantageously into a mechanical torque at the corresponding engine 21, 22 to which it is connected, and is also configured to convert a mechanical force, advantageously a mechanical torque received from the corresponding engine 21, 22, into an electric current. Each electric machine 31, 32 is, for example, an electric motor, powered either by an electric current to supply torque, or by torque to supply electricity.

Advantageously, the electrical current produced by the electrical machines 31 and 32 is a three-phase alternating current. The first and second electrical machines 31 and 32 are, for example, asynchronous, synchronous or with variable reluctance. Advantageously, the first and second electrical machines 31 and 32 are identical.

In the example shown in the figures, the electrical machines 31 and 32 are machines with several windings, also known as multi-channel or star machines. Electrical machines 31 and 32 are electrical machines with two windings, windings 35 and 37 for the first electrical machine and windings 36 and 38 for the second electrical machine 32, shown schematically in the figures. Each winding 35, 36, 37, 38 advantageously comprises three phases to produce or receive three-phase current.

The power supply network 20 includes an auxiliary electrical source 41 connected to the sharing bus 45 for its power supply.

The auxiliary power source 41 comprises a battery 41*a* and an auxiliary power unit 41*b*. Advantageously, the battery 41*a* is configured to supply high-voltage direct current, for example, with a voltage equal to 270 V. Advantageously, the battery 41*a* is connected to the sharing bus 45 via a first sharing switch 42. The auxiliary power unit 41*b* is for example a engine coupled to an electrical machine supplying direct current, or according to another example, a engine coupled to an electrical machine configured to produce alternating current, itself connected to an AC-DC converter not shown. The auxiliary power unit 41*b* is advantageously connected to the sharing bus 45 via a second sharing switch 43. The auxiliary power unit 41*b* is, as shown in the figures, a engine coupled to an electrical machine in order to produce electricity. In a particularly advantageous manner, the battery 41*a* is configured to be recharged from a ground power unit supplying direct current, and the engine of the auxiliary power unit 41*b* is configured to be started from a ground power unit supplying alternating current.

The supply network 20 comprises a first distribution group 50, a second distribution group 60 and, particularly advantageously, a first additional distribution group 70 and a second additional distribution group 80. The first distribution unit 50 and the first additional distribution unit 70 are connected to the first electrical machine 31, more specifically to the first winding 35 and the second winding 37, respectively. The second distribution unit 60 and the second additional distribution unit 80 are connected to the second electrical machine 32, more specifically to the first winding 36 and the second winding 38, respectively.

The power supply network 20 also comprises electrical loads, in this case two sets of loads 105, 106, and two sets of additional loads 107 and 108, connected respectively to the first distribution group 50, the second distribution group 60, the first additional distribution group 70 and the second additional distribution group 80.

Each distribution group 50, 60, 70 and 80 comprises a converter, respectively a first converter 51, a second converter 61, a first additional converter 71 and a second additional converter 81 and an interconnection bus, respectively a first interconnection bus 53, a second interconnection bus 63, a first additional interconnection bus 73 and a second additional interconnection bus 83.

The first and second converters 51 and 61 are connected to the first windings 35 and 36 respectively, and the first and second additional converters 71 and 81 are connected to the second windings 37 and 38 respectively. The converters 51, 61, 71 and 81 are reversible converters, i.e. capable of producing direct current when supplied with alternating current, and alternating current when supplied with direct current. Two of the converters 51, 61, 71 and 81 are advantageously current inverters, and two others are voltage inverters. For example, the first and second converters 51 and 61 are voltage inverters and the first and second additional converters 71 and 81 are current inverters. Alternatively, the converters 51, 61, 71 and 81 are all voltage inverters, or all current inverters. Converters 51, 61, 71 and 81 are advantageously AC-DC converters.

Each interconnection bus 53, 63, 73 and 83 is respectively connected to the first converter 51, the second converter 61, the first additional converter 71 and the second additional converter 81.

The converters 51, 61, 71 and 81 are connected respectively to the first interconnection bus 53, to the second interconnection bus 63, to the first additional interconnection bus 73 and to the second additional interconnection bus 83 via primary switches, there being one primary switch per converter 51, 61, 71 and 81, respectively a first primary switch 52, a second primary switch 62, a first additional primary switch 72 and a second additional primary switch 82. Each first interconnection bus 53, 63, 73 and 83 is thus isolated or connected to the converter 51, 61, 71 and 81 belonging to the same distribution group 50, 60, 70 or 80.

Particularly advantageously, each distribution unit 50, 60, 70, 80 also comprises a distribution bus, respectively a first distribution bus 55, a second distribution bus 65, a first additional distribution bus 75 and a second additional distribution bus 85.

Advantageously, the interconnection buses 53, 63, 73 and 83 are connected respectively to the first set of loads 105, the second set of loads 106, the first set of additional loads 107 and the second set of additional loads 108 via respectively the first distribution bus 55, the second distribution bus 65, the first additional distribution bus 75 and the second additional distribution bus 85.

Alternatively, not shown, the load assemblies 105, 106, 107 and 108 are respectively connected directly to the interconnection buses 53, 63, 73 and 83. According to another variant not shown, the sets of loads 105, 106, 107 and 108 are connected to the interconnection buses 53, 63, 73 and 83 via the first distribution bus 55, the second distribution bus 65, the first additional distribution bus 75 and the second additional distribution bus 85 respectively, and furthermore, additional loads are also connected directly to the interconnection buses 53, 63 and/or the additional interconnection buses 73 and 83.

Each distribution bus 55 and 65 is connected to the interconnection bus 53 and 63 of the same distribution group 50 and 60 by a first and second distribution switch 54, 64 respectively, and each additional distribution bus 75 and 85 is connected to the additional interconnection bus 73 and 83 of the same additional distribution group 70 and 80 by a first and second additional secondary switch 74 and 84 respectively. Each interconnection bus 53, 63, 73 and 83 is connected to the load assembly 105, 106, 107 and 108 respectively.

The first additional interconnection bus 73 is connected to the first interconnection bus 53 via a first inter-group switch 57. Advantageously, the first additional interconnection bus 73 is connected to the first interconnection bus 53 directly via the first inter-group switch 57.

The second additional interconnection bus 83 is connected to the second interconnection bus 63 via a second inter-group switch 67. Advantageously, the second additional interconnection bus 83 is connected to the second interconnection bus 63 directly via the second inter-group switch 67.

Particularly advantageously, the first additional distribution bus 75 is connected to the first distribution bus 55 via a third inter-group switch 58 and the second additional distribution bus 85 is connected to the second distribution bus 65 via a fourth inter-group switch 68.

The first and second interconnection buses 53 and 63 are also connected to the sharing bus 45 by a first inter-bus switch 91 and a second inter-bus switch 92 respectively.

In a particularly advantageous manner, the first interconnection bus 53 is only connected to the sharing bus 45, to the first converter 51, to the first additional interconnection bus 73, and to the first distribution bus 55, and is connected thereto only by the switches 91, 52, 57 and 54 respectively and the first additional interconnection bus 73 is only connected to the first additional converter 71, to the first interconnection bus 53 and the first additional distribution bus 75, and is connected thereto only by switches 72, 57 and 74 respectively. The first distribution bus 55 is advantageously connected only to the first interconnection bus 53 and to the first additional distribution bus 75, and is connected thereto only by switches 54 and 58 respectively, and the first additional distribution bus 75 is connected only to the first distribution bus 55 and to the first additional interconnection bus 73 and is connected thereto only by switches 58 and 74 respectively.

The same applies to the second distribution buses 65 and 85.

The first interconnection bus 53 and 73 and the distribution bus 55 and 75 on the one hand, and the second interconnection bus 63 and 83 and the distribution bus 65 and 85 on the other hand are connected in square, respectively by switches 54, 74, 57 and 58 on the one hand and by switches 64, 84, 67 and 68 on the other hand. Interconnection buses 53, 63, 73 and 83, and distribution buses 55, 65, 75 and 85 are completely isolated from other buses, including the 45 sharing bus, if necessary.

In particular, the first and second interconnection buses 53 and 63 are connected to the auxiliary power source 41 only via the sharing bus 45. So, to connect the first and second engines 21 and 22 to the auxiliary power source 41, it is necessary to connect the first and second interconnection buses 53 and 63 to the sharing bus 45.

Advantageously, the converters 51, 61, 71 and 81 are connected only to one of the electrical machines 31 and 32 and to one of the interconnection buses 53, 63, 73 and 83, respectively to the first electrical machine 31 and to the first interconnection bus 53, to the second electrical machine 32 and to the second interconnection bus 63, to the first electrical machine 31 and to the first additional interconnection bus 73 and finally to the second electrical machine and to the second additional interconnection bus 83.

Switches 52, 54, 57, 58, 62, 64, 67, 68, 72, 74, 82, 84, 91, 92, 42 and 43 are advantageously mechanical controlled switches, such as isolators, contactors, circuit breakers, or semiconductor switches such as tyristors. Switches 52, 54, 57, 58, 62, 64, 67, 68, 72, 74, 82, 84, 91, 92, 42 and 43 are all identical, for example, but some switches are optionally different from the others, in terms of rating, control logic or technology used. For example, some switches are mechanical switches, while others are semiconductor switches.

Load sets 105 to 108 are loads configured to operate when supplied with DC current.

The load assemblies 105 to 108 are, for example, electronic equipment such as computers, radars, pumps, or components of a de-icing system for aircraft 10. For example, the first set of loads 105 is, for example, a left-hand de-icing system for the aircraft 10 and the second set of loads 106 is a right-hand de-icing system for the aircraft 10. Alternatively, not shown, the feed system 20 comprises fewer than four sets of loads, for example three sets of loads, one of the sets of loads being fed by two distribution groups at a time. This ensures a redundant power supply to this set of loads, which is particularly advantageous if this set of loads is equipment critical to the operation of the aircraft 10.

The converters 51, 61, 71 and 81 are advantageously configured to supply the load assemblies 105 to 108 with a current from a high voltage network, for example with a voltage equal to 270 V, or a low voltage network, for example equal to 28 V, depending on the requirements of the aircraft 10.

As shown in FIG. 1, the first and second engines 21 and 22 are each connected to an additional electrical machine, a third electrical machine 93 and a fourth electrical machine 94 respectively. The first and second engines 21 and 22, and the third and fourth electrical machines 93 and 94 form part of an additional electrical network 120 comprising the essential avionics functions 121 of the aircraft 10. The additional electrical network 120 is also referred to as the basic network 120 of the aircraft 10.

In addition, the first and second engines 21 and 22 are each advantageously connected to a fifth and sixth electrical machine 95 and 96, which are advantageously permanent magnet machines. The first and second engines 21 and 22, as well as the permanent magnet machines power a flight control network 130 of the aircraft 10, comprising flight control devices 131. The first and second engines 21 and 22 are therefore advantageously common to several networks of the aircraft 10, namely the power supply network 20, the avionics functions network 120 and the flight control network 130.

In a variant not shown, the supply network 20 comprises only the first and second sharing groups 50 and 60, which do not comprise a distribution bus. In this case, the first set of loads 105 is directly connected to the first interconnection bus 53 and the second set of loads 106 is directly connected to the second interconnection bus 63.

The power supply network 20 is configured to operate in several different configurations, some of which are shown in FIGS. 2 to 5.

A configuration for starting the first engine 21 using the auxiliary electrical source 41 is shown in FIG. 2.

In the configuration in which the first engine 21 is started by the auxiliary electrical source 41, the first and second engines 21 and 22 are initially stopped. Switches 42, 91 and 52 are controlled to be closed, for example following a command from the user. The other switches are open. Load sets 105 to 108 are not supplied with electricity. The auxiliary electrical source 41, in this case the battery 41a, supplies an electrical current, which flows through the sharing bus 45 and the first interconnection bus 53 to the first converter 51. The first converter 51 converts the direct current supplied by the battery 41a into the three-phase alternating current required to operate the first electrical machine 31. The first electric machine 31 thus supplies mechanical torque to the first engine 21. The first engine 21 is driven by the first electrical machine 31, in particular driven in rotation, in order to circulate air in the first engine 21 at a speed sufficient to start the first engine 21.

In a variant not shown, the second partition switch 43 is closed rather than the first partition switch 42. In this case, it is the auxiliary power unit 41b that supplies electric current to the first converter 51.

In a variant not shown, switches 42, 91, 57 and 72 are closed and the other switches are open. This is particularly advantageous, in order to continue to drive the first engine 21 in the event of malfunction or failure of the first converter 51.

Alternatively, the configuration for starting the first engine 21 by the auxiliary electrical source 41 is a hybrid configuration for the first engine 21, allowing, in the example shown in FIG. 2, hybrid operation of the first engine 21, which is then driven by the mechanical torque supplied by the electrical machine 31. Advantageously, when the power supply system 20 is in the hybridisation configuration of the first engine 21, the first converter 51 is supplied with electricity by the auxiliary electrical source 41, the first electrical machine 31 does not supply electricity to the first converters 51 and 71, and only mechanical torque to the first engine 21. The first additional converter 71 is powered neither by the auxiliary electrical source 41 nor by the first electrical machine 31.

A configuration for starting the second engine 22, or hybridisation by the auxiliary electrical source 41, is obtained by controlling switches 43, 92, 62 to close and controlling the other switches to open.

Figure 3:
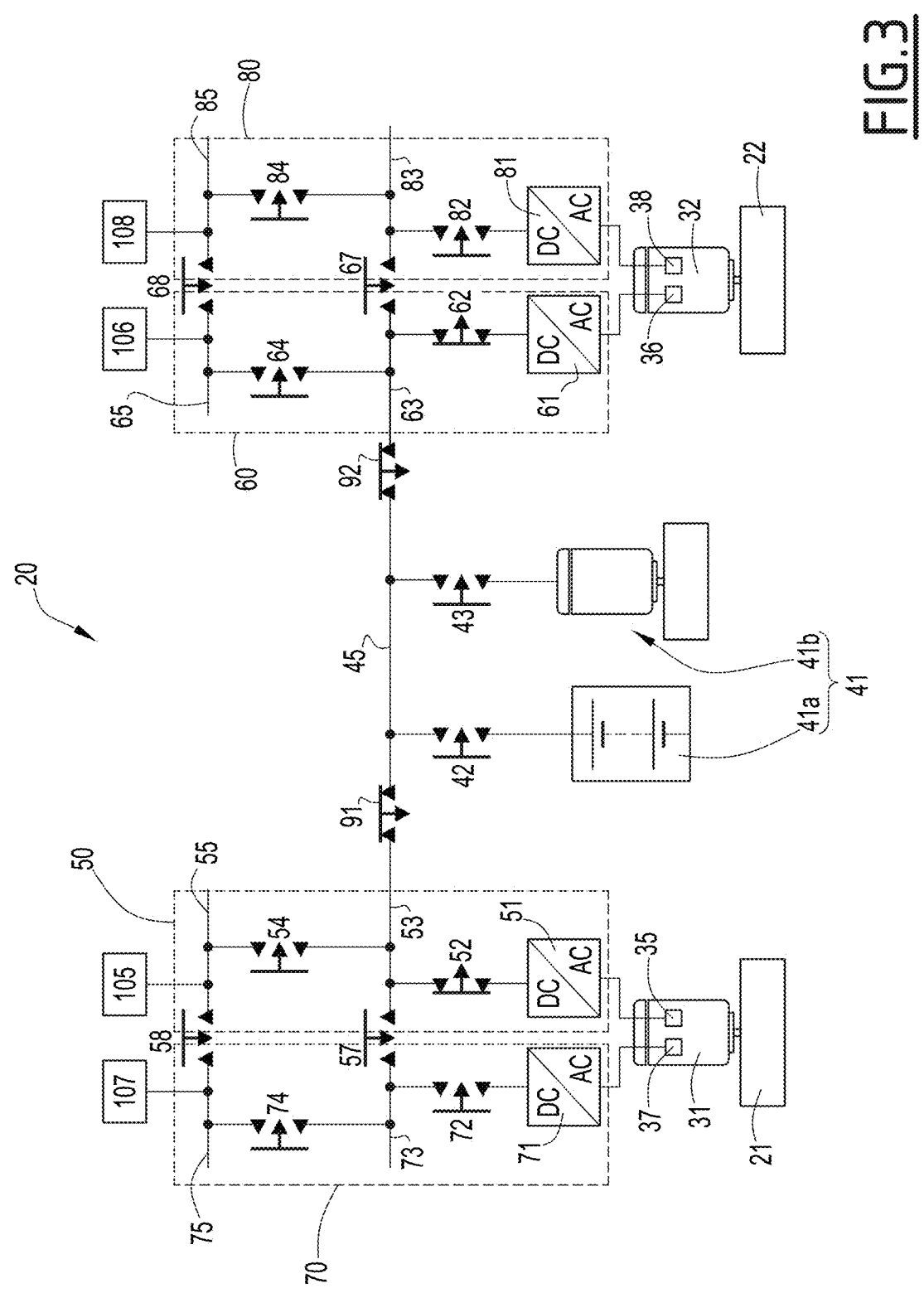
FIG. 3 is a schematic of the power supply network in FIG. 2 in a second start-up configuration.

FIG. 3 shows a engine start configuration, also known as a cross-start configuration. In the engine start configuration shown in FIG. 3, the first engine 21 is running and the second engine 22 is stopped. The first engine 21 supplies mechanical torque to the first electrical machine 31, which then supplies the first converter 51 with an electrical current, advantageously three-phase alternating current. The first converter 51 converts the current supplied by the first electrical machine 31 into direct current, for example high-voltage direct current, or low-voltage direct current. Switches 52, 91, 92 and 62 are commanded to close, and the other switches are commanded to open. Load sets 105 to 108 are therefore not powered. Current flows from the first converter 51 through the first interconnection bus 53, the sharing bus 45 and the second interconnection bus 63 to the second converter 61. The second converter 61 converts the current into three-phase alternating current, which is then supplied to the second electrical machine 32. The electric machine 32 converts the electric current into mechanical torque to start the second engine 22.

In a non-represented variant of the engine start configuration, switches 72, 52, 57, 91, 92, 62, 67 and 82 are all closed. So, when the first engine 21 is running, the two windings 35 and 37 are used to generate electricity, and the two windings 36 and 38 are used to generate engine torque.

Optionally, particularly in the event of a failure, for example of the first converter 51, it is still possible to start the second engine, by closing switches 72 and 57 instead of switch 52. In this case it is the first additional converter 71 which converts the current from the first electrical machine 31, which then flows into the first additional interconnection bus 73 and then into the first interconnection bus 53.

In a configuration not shown, the load assemblies 105 to 108 are supplied by the auxiliary power source 41. For example, switches 42, 91, 92, 54, 64, 74, 58 and 68 are closed and the other switches are open.

Figure 4:
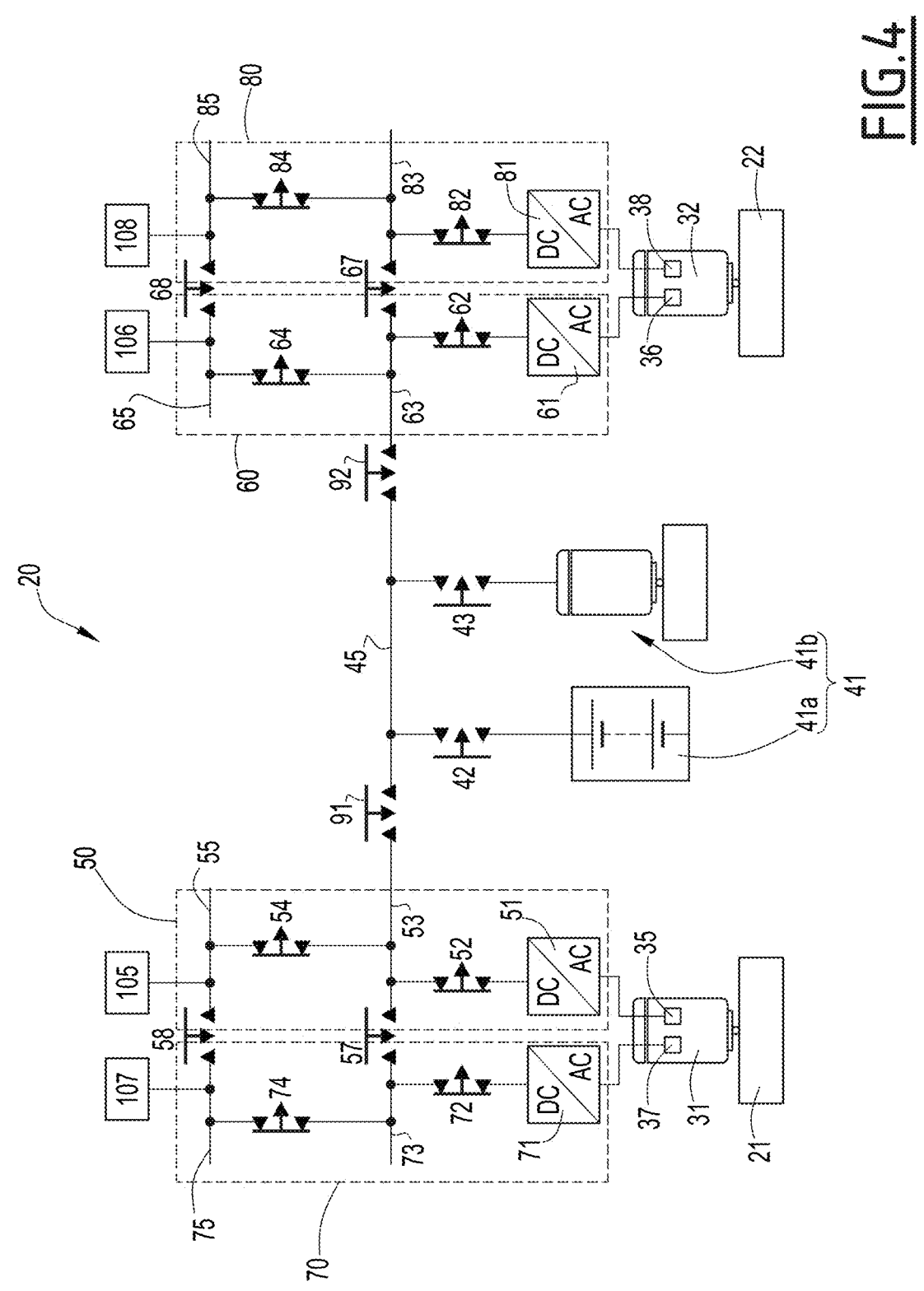
FIG. 4 is a schematic of the power supply network in FIG. 2 in a power supply configuration.

FIG. 4 shows a normal power supply configuration, i.e. when the aircraft is in flight and the power supply network 20 is not malfunctioning.

In the power supply configuration, switches 52, 62, 72, 82, 54, 64, 74 and 84 are controlled to close and the other switches are controlled to open. The first engine 21 and the second engine 22 are running. The first and second electrical machines 31 and 32 produce electricity, which is supplied to converters 51, 61, 71 and 81, which convert the current supplied by the electrical machines 31 and 32 into high-voltage direct current or low-voltage direct current. Thus, for each distribution group 50, 60, 70, 80, an electric current flows from each converter 51, 61, 71 and 81 of the distribution group in the interconnection bus 53, 63, 73 and 83, in the distribution bus 55, 65, 75 and 85 to the set of loads 105 to 108, respectively connected to the distribution buses 55, 65, 75 and 85, the set of loads 105 to 108 thus being supplied with electricity.

In the power supply configuration, the sets of loads 105 to 108 are thus powered independently of each other by the first and second engines 21 and 22. The loads 105 to 108 are thus supplied from an electrical network 20 separate from the basic network 120.

Figure 5:
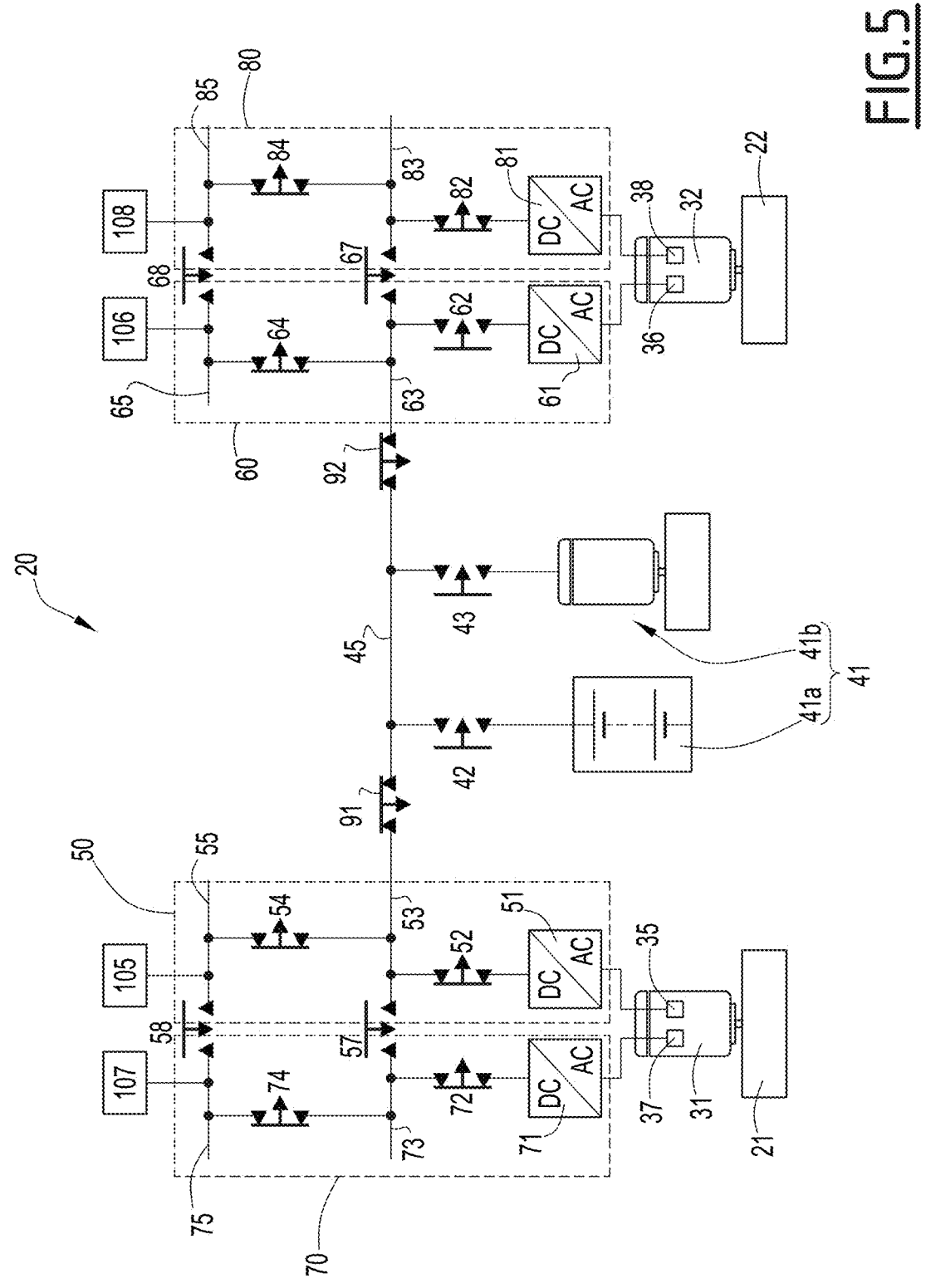
FIG. 5 is a schematic of the power supply network in FIG. 2 in a fault configuration.

FIG. 5 shows an example of a fault configuration in which the second converter 61 does not operate correctly. In the fault configuration shown in FIG. 5, switches 52, 72, 82, 54, 64, 74, 84, 91 and 92 are controlled to close and the other switches are controlled to open.

The second converter 61 is isolated from the rest of the power supply network 20 by opening the primary switch 62. In this case, the second electrical machine 32 no longer supplies electricity to the second interconnection bus 63 and therefore to the second set of loads 106. It is the first electrical machine 31 that supplies the second set of loads 106, the electrical current supplied by the first electrical machine flowing from the first electric machine circulating from the first converter 51 in the first interconnection bus 53 and then on the one hand in the first distribution bus 55 to the first set of loads 105, and on the other hand in the sharing bus 45, the second interconnection bus 63 and the second distribution bus 65 to the second set of loads 106.

Depending on the criticality of the load assemblies 105 to 108, other alternative configurations are possible, for example, by controlling switches 82, 84, 68 to close and the other switches to open. In this case, the load sets 108 and 106 are both supplied from the second additional converter 81. This is particularly advantageous if the second set of additional loads 108 is a set of non-critical loads, or which even operates with an electrical power supplied lower than a nominal electrical power, the nominal electrical power being obtained in operation in the supply configuration of the supply network 20.

Alternatively, in the event of a fault in the first or second additional interconnection bus 73 or 83, for example the second additional interconnection bus 83, the latter is isolated by opening the switches 82, 67 and 84. The second set of additional loads 108 is advantageously supplied with electricity from the second converter by closing the switch 68. Advantageously, in particular to maintain an electrical power supplied to the second set of additional loads 108 closer to the rated electrical power, switches 91 and 92 are controlled when closing. The second sets of loads 106 and 108 are then supplied with electricity from both the first and second converters 51 and 61.

The architecture of the power supply network 20 thus makes it possible to supply each set of loads 105 to 108, either from one of the engines 21 or 22, or from the auxiliary electrical source 41, while keeping them isolated from each other. In the event of a fault, the power supply network 10 can be configured to adapt and continue to supply power to all the load sets 105 to 108.

The converters 51, 61, 71 and 81 thus allow the use of different sources, and the operation of the electrical machines 31 and 32 as sources of electricity or as sets of loads to operate the engines 21 and 22, using the same power supply network 20.

Figure 6:
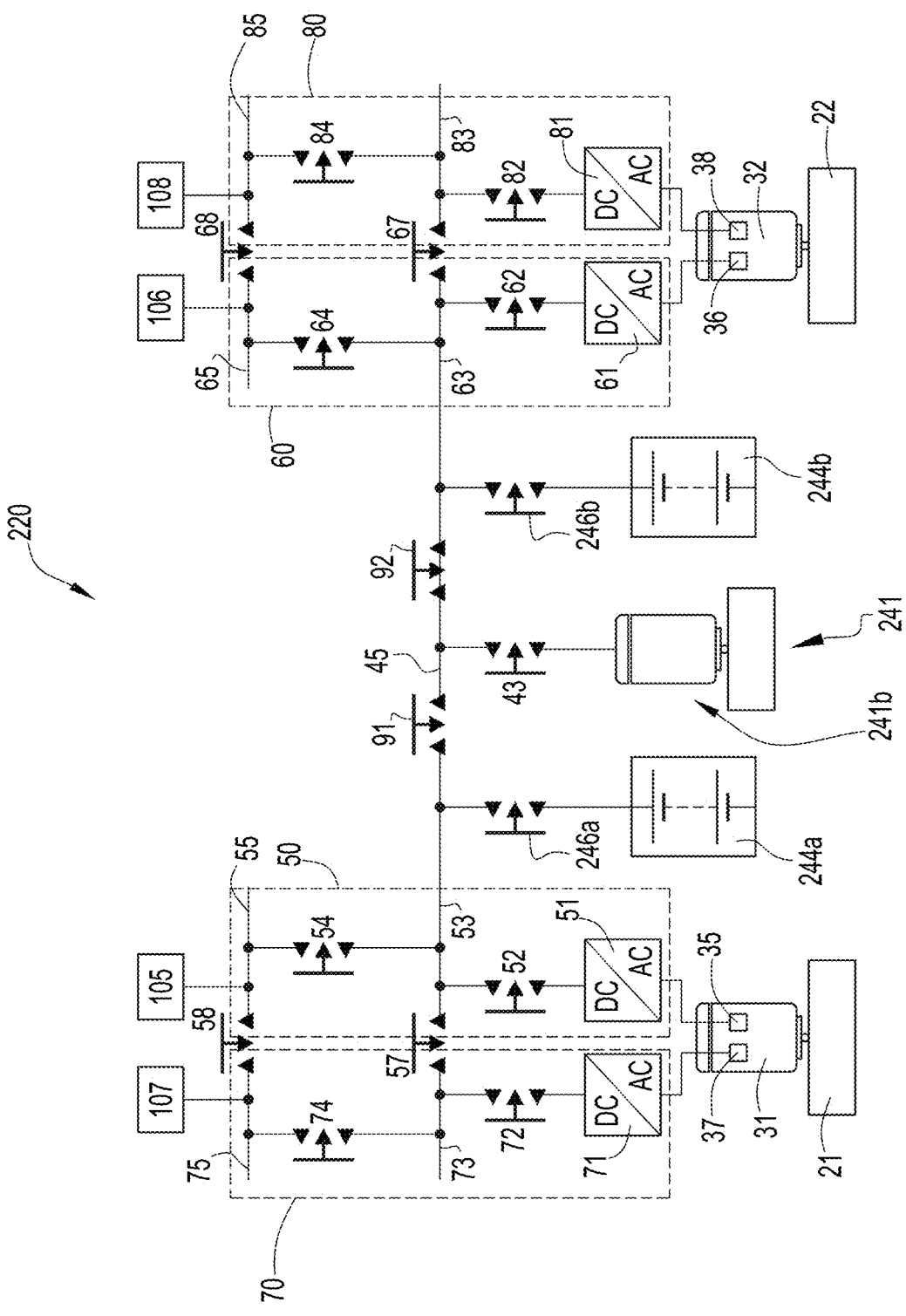
FIG. 6 is a diagram of a power supply network according to a second embodiment of the present disclosure.

FIG. 6 shows a supply network 220, as an alternative embodiment of the supply network 20. The supply network 220 differs from the supply network 20 in that it comprises an auxiliary electrical source 241, which replaces the auxiliary electrical source 41. The auxiliary power source 241 comprises only one auxiliary power unit 241b. The auxiliary power unit 241b is here a engine coupled to a generator, which is optionally not shown, coupled to a converter.

The power supply network 220 also comprises a first battery 244a and a second battery 244b, each connected to one of the interconnection buses 53 and 63. In the example shown in FIG. 6, the first battery 244a is connected to the first interconnection bus 53 via a first battery switch 246a and the second battery 244b is connected to the second interconnection bus 63 via a second battery switch 246b. The presence of batteries 244a and 244b and their respective connection directly to the interconnection bus 53 and 63 makes it possible to improve the redundancy of network 220 and in particular to supply the distribution groups 50, 70 by battery 244a and the distribution groups 60 and 80 by battery 244b in the event of a failure or faulty connection of the sharing bus 45.

Figure 7:
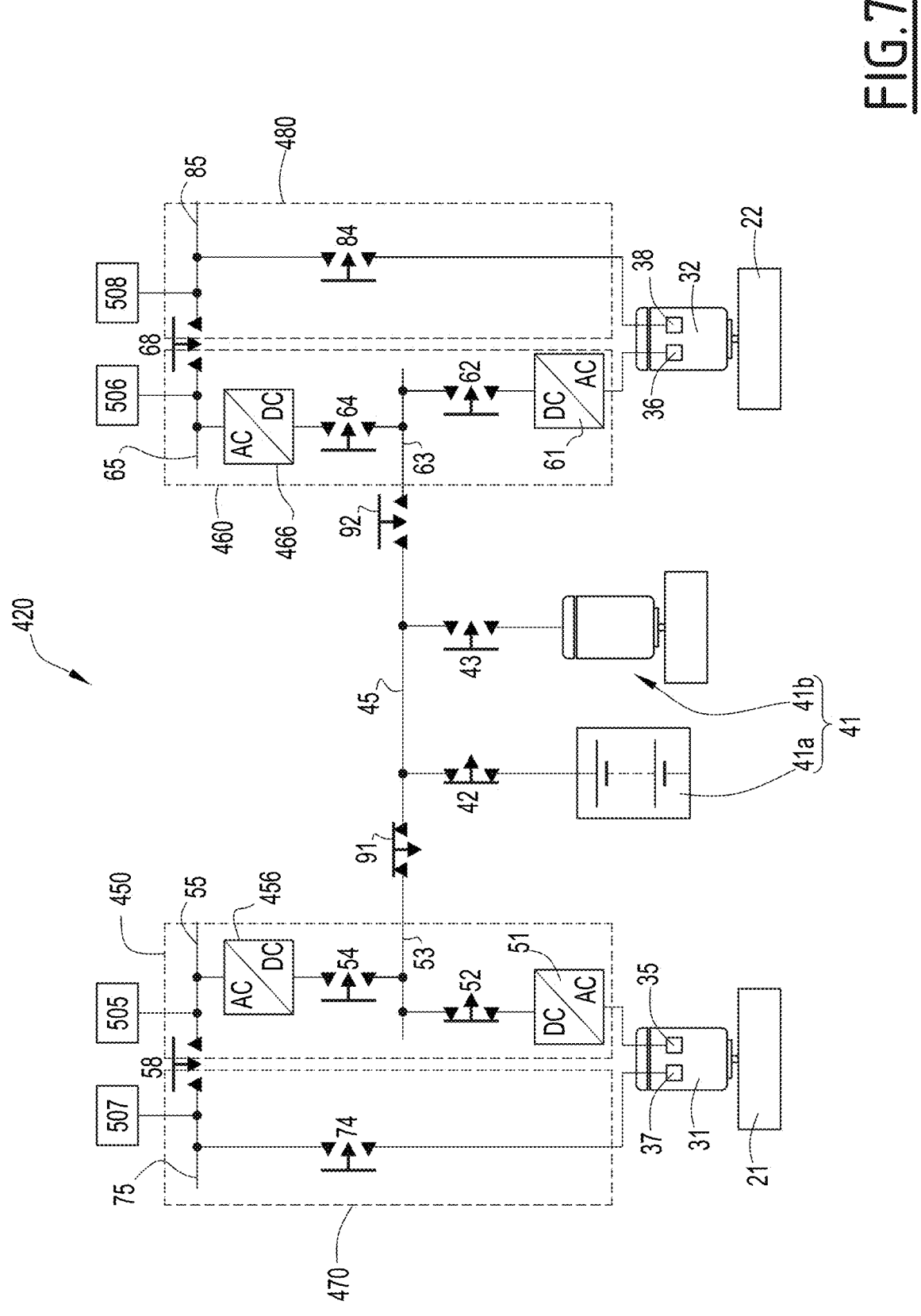
FIG. 7 is a diagram of a power supply network according to a third embodiment of the present disclosure.

FIG. 7 shows a 420 power supply network as an alternative embodiment of the present disclosure. The differences between supply network 420 and supply network 20 are described below.

The supply network 420 differs from the supply network 20 in that it comprises distribution groups 450, 460, and additional distribution groups 470 and 480 which replace distribution groups 50, 60 and additional distribution groups 70 and 80 respectively. The power supply network 420 also comprises sets of loads 505, 506, 507 and 508 which replace the sets of loads 105, 106, 107 and 108 respectively and which are configured to operate when supplied with alternating current.

Distribution units 450 and 460 differ from distribution units 50 and 60 in that they also include a first load converter 456 and a second load converter 466 respectively. Load converters 456 and 466 are connected between the first secondary switch 54 and the first distribution bus 55 and between the second secondary switch 64 and the second distribution bus 65 respectively. Load converters 456 and 466 are DC-AC converters, and are configured to convert DC power received from interconnection buses 53 and 63 into AC power to supply load sets 505 and 506 respectively. Advantageously, the load converters 456 and 466 are reversible converters.

The additional distribution groups 470 and 480 differ from the additional distribution groups 70 and 80 in that they do not include additional converters, an additional interconnection bus, an additional primary switch and an inter-group switch. The first and second additional distribution buses 75 and 85 are connected to the first and second electrical machines 31 and 32 respectively, more specifically to windings 37 and 38 directly via the additional secondary switches 74 and 84.

The start-up configuration of the first engine 21, which is shown in FIG. 7, and the cross-start configuration are identical to those described for the network 20. In particular, in the starting configuration of the first engine 21, switches 42 or 43, 91 and 52 are controlled to close and the other switches are controlled to open, and in the cross-start configuration, where the first engine 21 is initially running and the second engine 22 is initially stopped, switches 52, 91, 92 and 62 are commanded to close and the other switches are commanded to open.

In the power supply configuration, switches 52, 54, 74, 62, 64 and 84 are controlled to close and the other switches are controlled to open. The converters 51 and 61 convert the alternating current supplied by the electrical machines 31 and 32 into direct current, which flows to the load converters 456 and 466. The load converters 456 and 466 again convert the direct current into alternating current to supply the loads 505 and 506 with alternating current.

Thus, when current flows in the sharing buses 45 and in the interconnection buses 53 and 63, it is direct, and when current flows in the distribution buses 55, 65 75 and 85, it is alternating.

In the event of a failure, for example of the first converter 51, it is possible to maintain the power supply to the load 505 by closing the switches 54, 91, 92 and 62, or by commanding the switches 74 and 58 to close, which also makes it possible to maintain the power supply to the load assembly 505 in the event of a failure of the first interconnection bus 53 or of the load converter 456. Of course, other configurations are possible, in particular to maintain the power supply to the load assemblies 506, 507 and 508.

Advantageously, if the first load converter 456 is reversible, if it is desired to recharge the battery 41_a_ in the event of failure of the converter 51, it is possible to continue to do so by controlling switches 74, 58, 54 91 and 42 in the closed position, the other switches being controlled in the open position. The first load converter 456 then converts alternating current received from the first additional distribution bus 75 into direct current, which then supplies the battery 41_a_ via the first interconnection bus 53.

In this way, it is possible to supply the sets of loads 505 to 508, which are loads that operate when supplied with alternating current, from the engines 21 and 22 and from the auxiliary electrical source 41, which supplies direct current, in configurations that make it possible to adapt to faults in the supply network 420.

Alternatively, not shown, sets of additional loads, operating when supplied with DC power, are connected to the interconnection buses 53 and 63 and to the sharing bus 45.

Alternatively, not shown, the power supply 420 comprises a single engine, for example engine 21. In this case, the power supply network 420 comprises the engine 21, the electrical machine 31, the first distribution units 450 and 470, the load assemblies 505 and 507, the auxiliary power source 41, the sharing bus 45 and the first inter-bus switch 91.

Any feature described for one embodiment or variant in the foregoing may be implemented for the other embodiments and variants described above, insofar as technically feasible.

What is claimed is:

1. A power supply network for an aircraft comprising:
a first engine;
a second engine;
a first set of loads;
a second set of loads;
an auxiliary electrical source;
a first electrical machine, mechanically connected to the first engine;
a first converter, connected to the first electrical machine;
a first interconnection bus, connected on the one hand to the first converter by a first primary switch and on the other hand to the first set of loads;
a second electrical machine, mechanically connected to the second engine;
a second converter;
a second interconnection bus, connected on the one hand to the second converter by a second primary switch and on the other hand to the second set of loads; and
a sharing bus, connected to the first interconnection bus by a first inter-bus switch, connected to the second interconnection bus by a second inter-bus switch and connected to the auxiliary electrical source, the network further comprising
a first additional converter, and a second additional converter connected respectively to the first electrical machine and to the second electrical machine;
a first additional interconnection bus and a second additional interconnection bus, connected respectively to the first additional converter by a first additional primary switch and to the second additional converter by a second additional primary switch; and
a first set of additional loads and a second set of additional loads, connected respectively to the first additional interconnection bus and to the second additional interconnection bus.

2. The network according to claim 1, in which the first and second electrical machines comprise independent first and second windings respectively and the first and second converters are connected to the first windings of the first and second electrical machines respectively and the first and second additional converters are connected to the second windings of the first and second electrical machines respectively.

3. The network according to claim 1, also comprising:
a first distribution bus and a second distribution bus, connected respectively to the first interconnection bus by a first secondary switch and to the second interconnection bus by a second secondary switch and connected respectively to the first set of loads and to the second set of loads.

4. The network according to claim 3, further comprising:
a first set of additional loads and a second set of additional loads; and
a first additional distribution bus and a second additional distribution bus,
the first and second additional distribution buses being respectively connected only:
to the first distribution bus via a third inter-group switch, and to the second distribution bus via a fourth inter-group switch;
to the first set of additional loads and the second set of additional loads; and
to the first additional interconnection bus by a first additional secondary switch, and
to the second additional interconnection bus by a second additional secondary switch.

5. The network according to claim 1, in which two of the first converter, the second converter, the first additional converter and the second additional converter are voltage inverters and two converters are current inverters.

6. The network according to claim 1, in which the first and second electrical machines are each one of an asynchronous machine, a synchronous machine and a variable reluctance machine.

7. The network according to claim 1, in which the first and second interconnection buses are connected to the auxiliary electrical source solely via the sharing bus.

8. The network according to claim 1, further comprising a first battery and a second battery, connected respectively to the first interconnection bus and to the second interconnection bus.

9. The network according to claim 1, further comprising a first load converter and a second load converter, connected on the one hand respectively to the first interconnection bus and to the second interconnection bus and on the other hand respectively to the first set of loads and to the second set of loads.

10. The network according to claim 1, the network being configured to be in a start-up configuration, wherein the first primary switch and the first inter-bus switch are closed, and wherein the first electrical machine is powered by the auxiliary electrical source so that the first electrical machine generates a mechanical torque.

11. The network according to claim 3, the network being configured to be in a power supply configuration, wherein the first primary switch and the first secondary switch are closed, and wherein the first electric machine converts a mechanical torque supplied by the first engine into an electric current.

12. An aircraft comprising a power supply network according to claim 1.

13. The aircraft according to claim 12, further comprising an avionics functions network and a flight control network, connected to at least one electrical machine different from the first and second electrical machines, driven by one of the first and second engines.

14. A power supply network for an aircraft comprising:

a first engine;

a second engine;

a first set of loads;

a second set of loads;

an auxiliary electrical source;

a first electrical machine, mechanically connected to the first engine;

a first converter, connected to the first electrical machine;

a first interconnection bus, connected on the one hand to the first converter by a first primary switch and on the other hand to the first set of loads;

a second electrical machine, mechanically connected to the second engine;

a second converter;

a second interconnection bus, connected on the one hand to the second converter by a second primary switch and on the other hand to the second set of loads; and a sharing bus, connected to the first interconnection bus by a first inter-bus switch, connected to the second interconnection bus by a second inter-bus switch and connected to the auxiliary electrical source, the network further comprising a first additional converter, and a second additional converter connected respectively to the first electrical machine and to the second electrical machine;

a first additional interconnection bus and a second additional interconnection bus, connected respectively to the first additional converter by a first additional primary switch and to the second additional converter by a second additional primary switch; and a first set of additional loads and a second set of additional loads, connected respectively to the first additional interconnection bus and to the second additional interconnection bus, wherein the first and second additional interconnection buses are directly and solely connected respectively to the first interconnection bus by a first inter-group switch and to the second interconnection bus by a second inter-group switch.

* * * * *